(12) United States Patent
Breitbach et al.

(10) Patent No.: US 6,779,806 B1
(45) Date of Patent: Aug. 24, 2004

(54) ADJUSTABLE TORSION BAR ANCHOR FOR VEHICLE

(75) Inventors: John Breitbach, Grenville, WI (US); Jesse Gander, Neenah, WI (US); Greg Mathe, Oshkosh, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 86 days.

(21) Appl. No.: 10/085,980

(22) Filed: Feb. 28, 2002

(51) Int. Cl.[7] ............................................. B60G 21/05
(52) U.S. Cl. .................. 280/124.106; 280/124.107; 280/124.13; 280/124.149
(58) Field of Search ............... 280/124.106, 124.107, 280/124.149, 124.152, 124.166, 6.157, 124.13

(56) References Cited

U.S. PATENT DOCUMENTS

| | | | | |
|---|---|---|---|---|
| 2,606,758 A | * | 8/1952 | Collier .................... 267/278 |
| 2,642,568 A | * | 6/1953 | Kany ......................... 2/436 |
| 2,715,022 A | * | 8/1955 | Krotz ........................ 267/278 |
| 3,432,158 A | * | 3/1969 | Goodwin ................... 267/278 |
| 4,014,561 A | | 3/1977 | Tomiya et al. ............. 280/104 |
| 4,415,178 A | | 11/1983 | Hatsushi et al. ........... 280/664 |
| 4,473,238 A | | 9/1984 | Antoine ..................... 280/723 |
| 4,635,958 A | | 1/1987 | Yonemoto .................. 280/664 |
| 5,176,370 A | | 1/1993 | Yamamoto ................. 267/154 |
| 5,178,406 A | * | 1/1993 | Reynolds ............. 280/124.106 |
| 5,380,028 A | * | 1/1995 | Ferris et al. ............. 280/405.1 |
| 5,478,103 A | | 12/1995 | Maeda et al. ............... 280/661 |
| 5,609,331 A | | 3/1997 | Hoag et al. ................. 267/154 |
| 5,641,175 A | | 6/1997 | Maeda et al. ............... 280/664 |
| 5,685,527 A | * | 11/1997 | Harbali et al. ............. 267/277 |
| 5,687,960 A | | 11/1997 | Moon ......................... 267/273 |
| 5,839,741 A | | 11/1998 | Heyring ............... 280/124.106 |
| 5,921,569 A | | 7/1999 | Noutomi et al. ...... 280/124.167 |
| 6,099,006 A | | 8/2000 | Suglyanna et al. ... 280/124.149 |
| 6,357,771 B1 | * | 3/2002 | Clements et al. ...... 280/124.13 |
| 6,454,284 B1 | * | 9/2002 | Worman, Jr. ......... 280/124.167 |
| 6,467,784 B1 | * | 10/2002 | Kim ..................... 280/124.106 |
| 6,517,089 B2 | * | 2/2003 | Phillis et al. ............. 280/6.157 |
| 6,530,586 B2 | * | 3/2003 | Fader et al. .......... 280/124.106 |

* cited by examiner

Primary Examiner—Paul N. Dickson
Assistant Examiner—Toan To
(74) Attorney, Agent, or Firm—Foley & Lardner LLP

(57) ABSTRACT

The present invention provides an adjustable torsion bar anchor in a motor vehicle having a torsion bar coupled at one end to a movable suspension member. The adjustable torsion bar anchor comprises a bracket coupled to the vehicle. A socket is coupled to the bracket and is in co-axial alignment with the torsion bar. An anchor member is configured to couple to one end of the torsion bar and to rotably engage the socket. The torsion bar is then secured to the vehicle. Another embodiment of the adjustable torsion bar anchor includes another adjustable torsion bar anchor mounted on the vehicle with the tension rod of each anchor coupled to a tension tube configured to engage each tension rod and wherein the tension bar anchors are mounted opposite each other on a line traverse to the vehicle center line.

14 Claims, 4 Drawing Sheets

ADJUSTABLE TORSION BAR ANCHOR FOR VEHICLE

BACKGROUND OF THE INVENTION

The present invention relates to a wheel suspension for use in vehicles and more particularly to an adjustable torsion bar anchor in a work vehicle.

Conventional torsion bar-type suspensions have been employed as part of a wheel suspension for use in vehicles. Many torsion bar-type suspensions are utilized in passenger vehicles in order to provide a more comfortable ride for the passenger. In work vehicles, particularly in heavy-duty trucks such as material haulers (concrete haulers) and fire engines, a more critical concern is weight distribution of the work vehicle on its wheel assemblies.

The torsion bar-type suspension typically includes an arm mechanism and a torsion bar spring, generally referred to as a torsion bar. The arm mechanism supports a wheel and is vertically rotatable coupled to a vehicle body. The suspension can be utilized in a fixed wheel assembly or in a steerable wheel assembly. The torsion bar is securely interposed between the arm mechanism and the vehicle body and undergoes torsional deformation in response to vertical rotation of the arm mechanism.

When a force acts on a wheel in a top to bottom direction with respect to the vehicle body, the arm mechanism vertically rotates. Since the torsion bar undergoes torsional deformation in response to the rotation of the arm mechanism, the top to bottom force acting on the wheel is transferred to the torsion bar which acts as a spring.

Typically, the end of the torsion bar that is fixed to the vehicle body is provided with splines or a hexhead that engage corresponding grooves in an anchor coupled to the vehicle body. As the vehicle moves on an uneven surface or if the weight distribution of the vehicle shifts, the torsion bar anchor and the arm mechanism may become misaligned and the torsion bar or the splines will overstress and could fail. Further, adjustments of conventional torsion bars require the torsion bar to be removed from the anchor, rotated and reinstalled. This is time consuming and expensive for an operator of the work vehicle. Adjustment mechanisms coupled to the torsion bar can be used to make ride height adjustment easier, but torsion bar adjustment mechanisms are independent from each other; therefore, they are heavier and more complex and therefore more costly to operate and maintain.

Therefore, there is a need for a torsion bar anchor that is adjustable. There is a further need for an adjustable torsion bar anchor that will permit adjustment of the Vehicle Ride Height for the vehicle over all as well as have the ability to adjust the ride height from side to side of the vehicle without disassembling the torsion bar. There is also a need for connecting two torsion bar anchor assemblies on opposite sides of the vehicle to minimize rotation of the vehicle body during vehicle operation, and make the system lighter and less costly.

SUMMARY OF THE INVENTION

The present invention provides an adjustable torsion bar anchor in a motor vehicle having a torsion bar coupled at one end to a movable suspension member. The adjustable torsion bar anchor comprises a bracket coupled to the vehicle. A socket is coupled to the bracket and is in co-axial alignment with the torsion bar. An anchor member is configured to couple to one end of the torsion bar and to rotably engage the socket, wherein the torsion bar is secured to the vehicle. Another embodiment of the adjustable torsion bar anchor includes another adjustable torsion, bar anchor mounted on the vehicle with the tension rod of each anchor coupled to a tension tube configured to engage each tension rod and wherein the tension bar anchors are mounted opposite each other on a line traverse to the vehicle center line.

There is also provided a work vehicle comprising a vehicle support structure having a longitudinal center line. A first and second wheel assembly is coupled to the vehicle support structure with each wheel assembly having a movable suspension member. A torsion bar is coupled to the movable suspension member of each wheel assembly and to an adjustable torsion bar anchor. The torsion bar anchor comprises a bracket which is coupled to the vehicle support structure. A socket is coupled to the bracket and is in co-axial alignment with the torsion bar. An anchor member is configured to couple to one end of the torsion bar and to rotably engage the socket. Such engagement secures one end of the torsion bar to the vehicle support structure.

There is also provided an adjustable torsion bar anchor in a motor vehicle having a torsion bar coupled at one end to a movable suspension member. The adjustable torsion bar anchor comprises a means for bracketing coupled to the vehicle. A means for securing is coupled to the means for bracketing and is in co-axial alignment with the torsion bar. A means for anchoring member is configured to couple to one end of the torsion bar and to rotably engage the means for securing. The torsion bar is then secured to the vehicle.

DETAILED DESCRIPTION OF THE PREFERRED EMBODIMENTS

Figure 1:
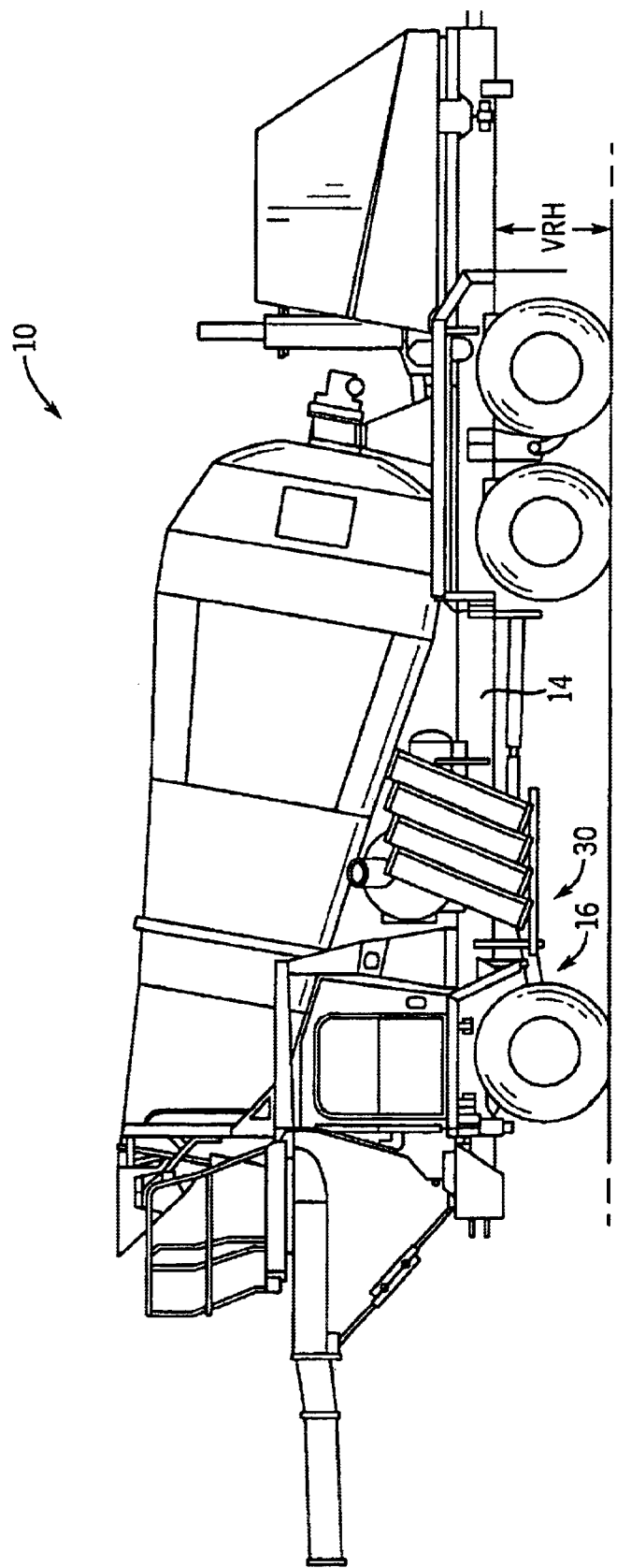
FIG. 1 illustrates a side plan view of a work vehicle of the heavy-duty truck type and specifically a concrete hauler, which includes an exemplary embodiment of an adjustable torsion bar anchor.

Referring to the FIGS. 1–5, there is illustrated a motorized work vehicle 10 of the heavy duty truck type, particularly a material hauler (concrete hauler). As illustrated in FIG. 1, such a motor vehicle 10 is supported above the surface at a certain Vehicle Ride Height by several wheel assemblies 16. Each wheel assembly is coupled to an adjustable torsion bar anchor 30 and a vehicle support structure 14. A Vehicle Ride Height is the distance between the vehicle support structure 14 and the surface on which the vehicle moves. It should be understood that the Vehicle Ride Height can vary because of the terrain over which the vehicle moves as well as the weight distribution of the vehicle itself. For example, the vehicle fully loaded with material will have a Vehicle Ride Height different than when the vehicle is empty of material.

Although a material hauler type vehicle 10 is depicted in FIG. 1, it should be understood that a variety of heavy duty trucks are contemplated. Specifically, a fire engine, of several types, as well as semi-trailers, flat beds, dump trucks, etc.

Figure 2:
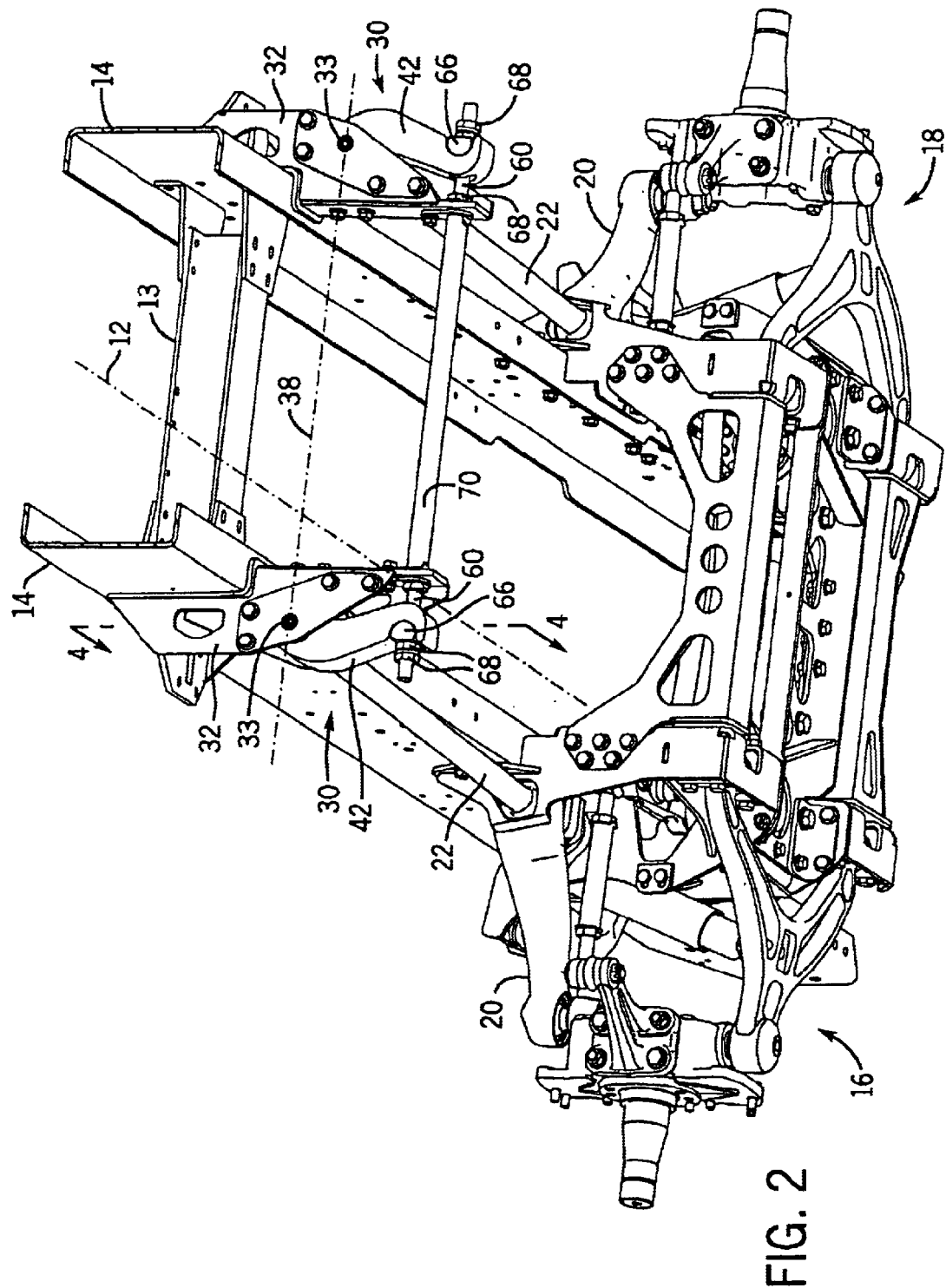
FIG. 2 illustrates a perspective, partial view of a vehicle support structure of a work vehicle having a first and second wheel assembly coupled to such support structure, as viewed from below the vehicle support structure.
Figure 3:
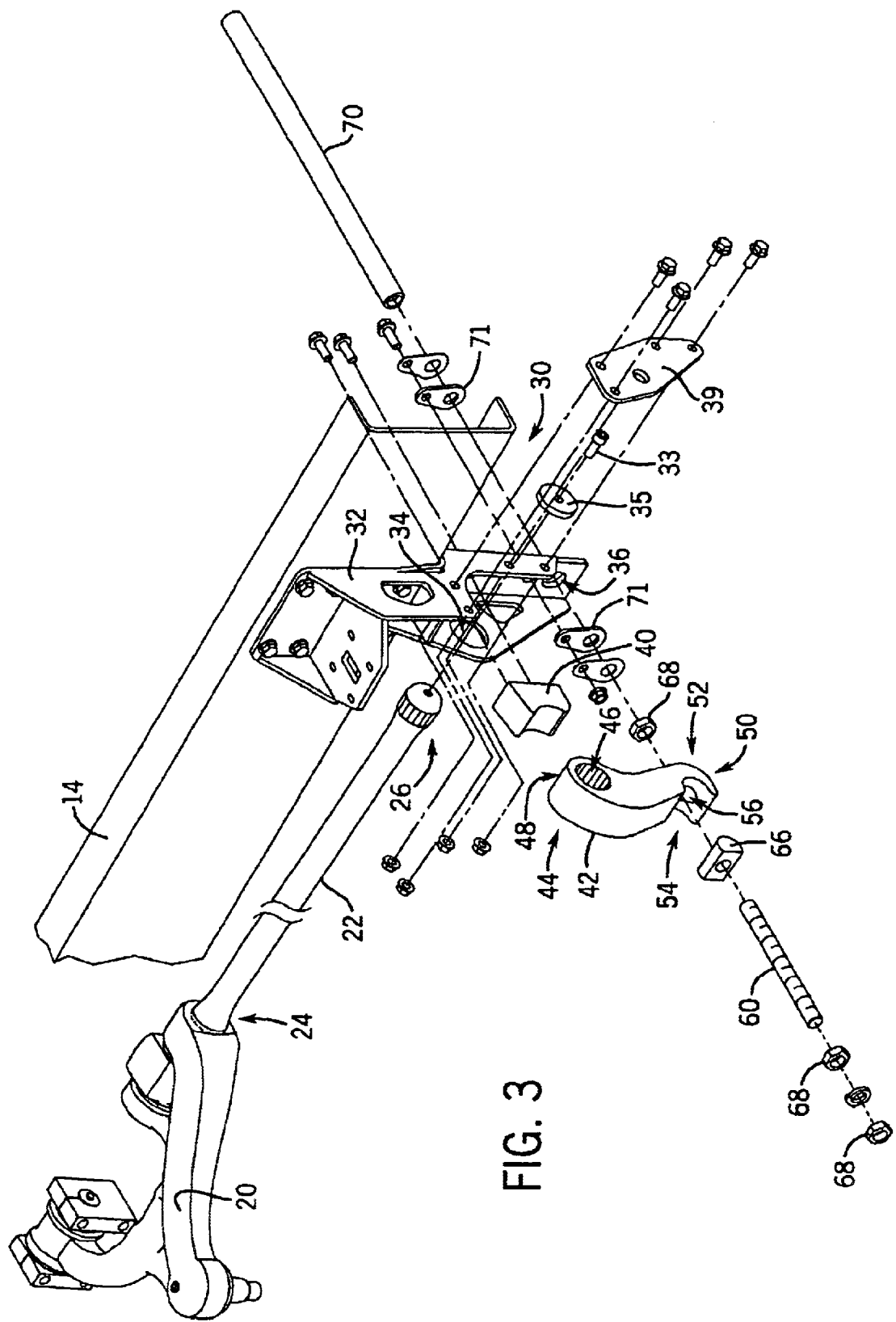
FIG. 3 illustrates a perspective, exploded view of an exemplary embodiment of an adjustable torsion bar anchor coupled to a vehicle support structure and one end of a torsion bar.

Referring to FIGS. 2 and 3, there is illustrated a partial perspective view of a vehicle support structure 14 with a first wheel assembly 16 and a second wheel assembly 18 coupled thereto. A vehicle center line 12 as illustrated is longitudinally down the center of the vehicle support structure 14. Typically, the vehicle support structure 14 is identical on each side of the center line 12, however, a mirror image is not a requirement.

Each wheel assembly 16, 18 includes a movable suspension member 20. Each wheel assembly 16, 18 is also coupled to a torsion bar 22. The torsion bar 22 has a first end 24 and a second end 26. One end 24 of the torsion bar 22 is coupled to the movable suspension member 20 and the other end 26 of the torsion bar 22 is coupled to an adjustable torsion bar anchor 30.

The adjustable torsion bar anchor 30 comprises a bracket 32 coupled to the vehicle 10 as illustrated in FIG. 2. The bracket 32 is generally coupled to the vehicle support structure 14.

The bracket 32 can be fastened to the vehicle support structure 14 with bolts as illustrated in FIG. 3 and it can also be welded to the vehicle support structure. The bracket 32 is configured with a first through hole 34 and a second through hole 36. The first and second through holes 34, 36 are configured at an approximate right angle to each other as shown in FIG. 3.

Figure 5:
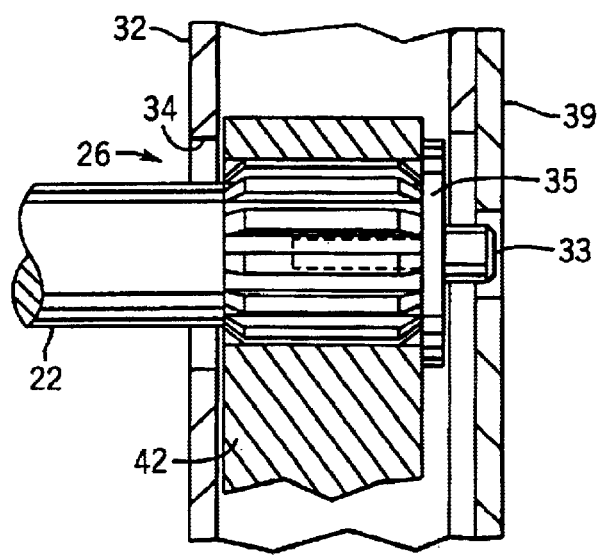
FIG. 5 is a partial, section view of the adjustable torsion bar anchor coupled to the torsion bar along the line 5—5 in FIG. 4.

The second end 26 of the torsion bar 22 passes through the first through hole 34 of the bracket 32 and is coupled to an anchor member 42 by passing into and through an orifice 46 configured in the first end 44 of the anchor member 42. A bolt 33 and washer 35 secures the torsion bar 22 to the anchor member 42 as shown in FIG. 5. The second end 26 of the torsion bar 22 can be provided with splines or hex head that engage grooves formed in the anchor member 42 within the orifice 46.

A socket 40 is coupled to the bracket 32 and is in coaxial alignment with the torsion bar 22. A contoured surface 48 on the first end 44 of the anchor member 42 contacts the socket 40. The socket 40 can be coupled to the bracket 32 by bolts as depicted in FIG. 3 or it can be welded or otherwise attached by any convenient and suitable method.

With the anchor member 42 coupled to the torsion bar, the second end 26 of the torsion bar is secured to the vehicle 10 and the anchor member 42 can rotate within the socket 40 along the contoured surface 48. An end plate 39 is removably mounted to the bracket 32, thereby providing access to the socket 40 and torsion bar 22 end 26.

Figure 4:
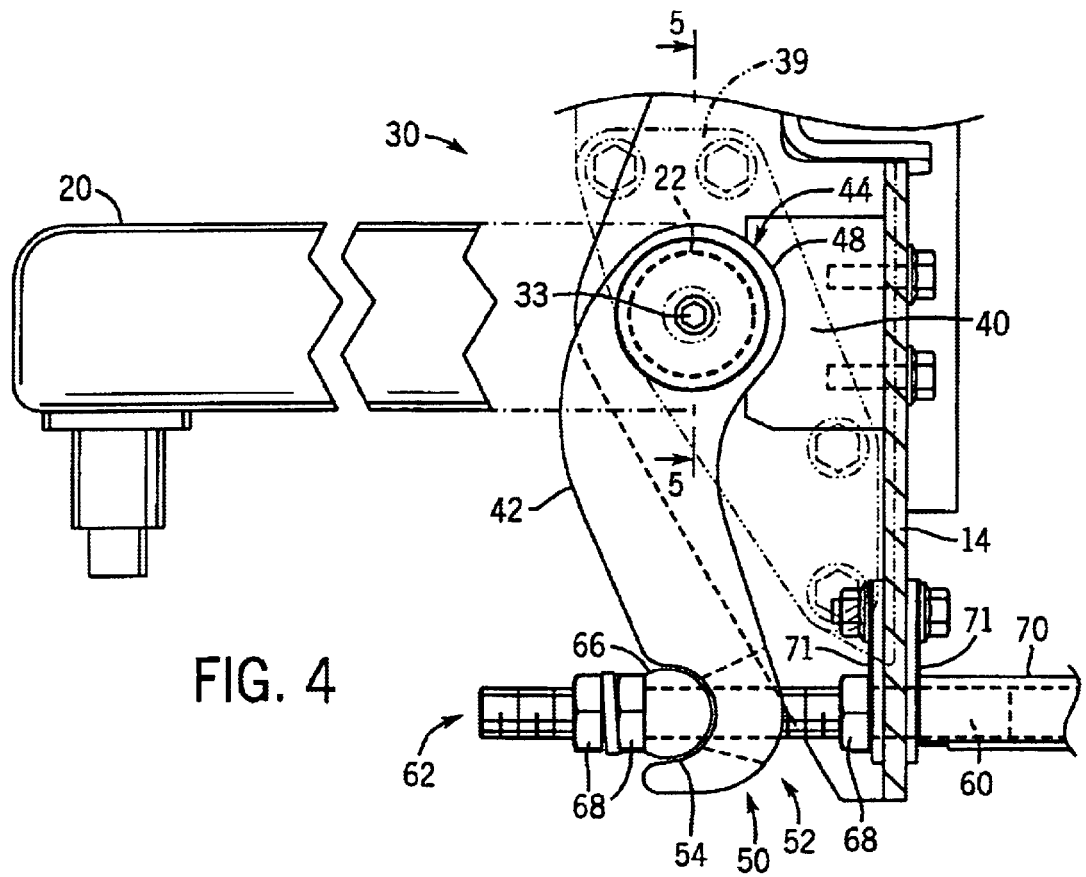
FIG. 4 is a side plan view of an exemplary embodiment of an adjustable torsion bar anchor along the line 4—4 in FIG. 2.

The anchor member has formed portion 52 at a second end 50 which end is distal from the first end 44 of the anchor member 42. A tension rod 60 having a first end 62 and a second end 64 is aligned traverse (i.e., perpendicularly) to the torsion bar 22 and coupled to one end 50 of the anchor member 42. The second end 50 of the anchor member 42 is configured with a semi-circular socket 54 which also defines a through hole 56. See FIG. 4. A half round pin 66 configured to correspond to the semi-circular socket 54 is coupled to the first end 62 of the tension rod 60. Jam nuts 68 secure the tension rod 60 to the half round pin 66 and the anchor member 42 as best seen in FIG. 4. It is also contemplated that other methods for coupling the anchor members 42 may be used, for example: a bolt threaded into the tension tube 70 can act as the jam nut 68 and tension rod 60 combination or a single tension rod extends between the anchor members 42 with a jam nut 68 on each end for adjustment. The second end 64 of the tension rod 60 passes through the second through hole 36 of the bracket 32 as best seen in FIGS. 3 and 4. A jam nut 68 secures the tension rod 6 in position with respect to the bracket 32.

Selective movement of the jam nut 68 on the tension rod 60 moves the anchor member 42 in one direction by moving the half round pin 66 relative to the tension rod 60, for example towards the bracket 32 or in another direction, for example, away from the bracket 32. Such motion of the anchor member 42 rotates the anchor member in the socket 40. The torsion bar 22, which is coupled to the anchor member 42, rotates moving the suspension member 20 of the wheel assembly. It is with such movement that an operator of the motor vehicle 10 can adjust the Vehicle Ride Height. For example, when the anchor member 42 is moved away from the bracket 32 the movable suspension member 20 moves vertically with respect to the vehicle support structure 14 thereby reducing the Vehicle Ride Height with respect to the surface the vehicle 10 moves over. Likewise, when the anchor member 42 is moved towards the bracket 32, the torsion bar 22 rotates and the movable suspension member 20 moves in a downward vertical motion relative to the vehicle support structure 14 thereby increasing the Vehicle Ride Height above the surface over which the vehicle moves.

Such adjustment of the Vehicle Ride Height can be accomplished by adjusting the several jam nuts 68 when the vehicle is in a stopped or static position. Tabbed locking washers 71 are used to engage flats on the jam nuts 68 and flats on the tension tube 70 to prevent loosening or movement of the tension rod 60 while in service.

It is also contemplated that another adjustable torsion bar anchor 30 is mounted on the vehicle 10 with the tension rod 60 of each anchor 30 coupled to a tension tube 70 configured to engage each tension rod. See FIGS. 2, 3 and 4. With the adjustable tension bar anchors 30 mounted opposite each other on a line 38 traverse to the vehicle center line 12, as shown in FIG. 2, the tension tube 70 couples the two adjustable torsion bar anchors 30 to each other. Each torsion bar anchor 30 can be moved independently by adjusting the respective jam nuts 68 along a threaded portion of the tension rod 60 for each torsion bar anchor 30. However, the two adjustable torsion bar anchors 30 restrains rotation of the vehicle support structure 14 around the vehicle center line 12. In other words, the two adjustable torsion bar anchors 30 being coupled together and a compression member 13 acts to minimize a twist motion in the vehicle support structure 14.

Thus, there is provided an adjustable torsion bar anchor for a motor vehicle having a torsion bar suspension with the adjustable torsion bar anchor comprising a bracket coupled to the vehicle with an anchor member configured to couple to one end of the torsion bar and rotably engage the socket wherein the end of the torsion bar is secured to the vehicle thereby allowing the Vehicle Ride Height to be raised or lowered. While the embodiments illustrated in the figures and described above are presented to illustrate an adjustable torsion bar anchor, it should be understood that these embodiments are offered by way of example only. It is not intended to be limited to any particular embodiment, but is intended to extend to various modifications that nevertheless fall within the scope of the appended claims. For example, each of the wheel assemblies can also include a separate drive motor coupled to a controller. It is also contemplated that the adjustable torsion bar anchor can be utilized on a non-motorized trailer type vehicle used to haul materials. Other modifications will be evident to those of ordinary skill in the art.

What is claimed is:

1. An adjustable torsion bar anchor arrangement in a motor vehicle having a torsion bar coupled at one end to a movable suspension member on each side of the vehicle, the adjustable torsion bar anchor arrangement comprising:
   a first and second torsion bar anchor mounted opposite each other on a line traverse to the vehicle centerline, each torsion bar anchor including:
   a bracket coupled a bracket coupled to the vehicle;
   a socket coupled to the bracket and in coaxial alignment with the torsion bar;
   an anchor member configured to couple to one end of the torsion bar, and to rotatably engage the socket, wherein the end of each the torsion bar is secured to the vehicle,
   a tension rod aligned traverse to the torsion bar and coupled to one end of the anchor member with a jam nut, wherein selective movement of the jam nut on the tension rod moves the respective anchor member causing the anchor member to rotate in the socket, wherein the associated torsion bar rotates moving the associated suspension member, and
   a tension tube configured to engage each tension rod, wherein the tension rods of each anchor are coupled together across from each other.

2. The adjustable torsion bar anchor arrangement of claim 1, wherein each torsion bar anchor can be moved independently.

3. The adjustable torsion bar anchor arrangement of claim 1, wherein the movement of either anchor member in one direction raises the vehicle and movement in another direction lowers the vehicle relative to the Vehicle Ride Height.

4. The adjustable torsion bar anchor arrangement of claim 1, wherein the tension rod couples to the anchor member through a half-round pin configured to rotate in a corresponding semi-circular socket formed in the anchor member.

5. A work vehicle comprising:
   a vehicle support structure having a longitudinal centerline;
   a first and second wheel assembly coupled to the vehicle support structure with each wheel assembly having a movable suspension member;
   a torsion bar coupled to each movable suspension member of each wheel assembly and to an adjustable torsion bar anchor, with the torsion bar anchors mounted opposite each other on a line traverse to the vehicle support structure centerline, each torsion bar anchor comprising:
   a bracket coupled to the vehicle support structure;
   a socket coupled to the bracket and in coaxial alignment with the torsion bar;
   an anchor member configured to couple to one end of the torsion bar, and to rotatably engage the socket, wherein the end of the torsion bar is secured to the vehicle support structure;
   a tension rod aligned traverse to the torsion bar and coupled to one end of the associated anchor member with a jam nut, wherein selective movement of the jam nut on the tension rod moves the respective anchor member causing the anchor member to rotate in the socket, wherein the torsion bar rotates moving the associated suspension member; and
   a tension tube configured to engage each tension rod, wherein the tension rods of each anchor are coupled together across from each other.

6. The work vehicle of claim 5, wherein each torsion bar anchor can be moved independently.

7. The work vehicle of claim 5, wherein the movement of one of the anchor members in one direction raises the vehicle support structure and movement in another direction lowers the vehicle support structure relative to the Vehicle Ride Height.

8. The work vehicle of claim 5, wherein each of the tension rod couples to the associated anchor member through a half-round pin configured to rotate in a corresponding semi-circular socket formed in each anchor member.

9. The work vehicle of claim 5, wherein the vehicle is a heavy duty truck.

10. The work vehicle of claim 9, wherein the heavy duty truck is one of a material hauler and a fire truck.

11. An adjustable torsion bar anchor arrangement in a motor vehicle having a torsion bar coupled at one end to a movable suspension member on each side of the vehicle, the adjustable torsion bar anchor arrangement comprising:
    a first and second torsion bar anchor mounted opposite each other on a line traverse to the vehicle centerline, each torsion bar anchor including:
    a means for bracketing coupled a bracket coupled to the vehicle;
    a means for securing coupled to the means for bracketing and in coaxial alignment with the torsion bar;
    an means for anchoring configured to couple to one end of the torsion bar, and to rotatably engage the means for securing, wherein the end of each the torsion bar is secured to the vehicle,
    a means for tensioning aligned traverse to the torsion bar and coupled to one end of the anchor member with a jam nut, wherein selective movement of the means for tensioning moves the respective means for anchoring causing the means for anchoring to rotate in the means for securing, wherein the associated torsion bar rotates moving the associated suspension member, and
    a tension tube configured to engage each means for tensioning, wherein the means for tensioning of each anchor are coupled together across from each other.

12. The adjustable torsion bar anchor arrangement of claim 11, wherein each means for anchoring can be moved independently.

13. The adjustable torsion bar anchor arrangement of claim 11, wherein the movement of either means for anchoring in one direction raises the vehicle and movement in another direction lowers the vehicle relative to the Vehicle Ride Height.

14. The adjustable torsion bar anchor arrangement of claim 11, wherein the means for tensioning couples to the means for anchoring through a half-round pin configured to rotate in a corresponding semi-circular socket formed in the means for anchoring.

* * * * *